United States Patent
Kindberg et al.

(10) Patent No.: US 7,370,200 B2
(45) Date of Patent: May 6, 2008

(54) VALIDATION FOR SECURE DEVICE ASSOCIATIONS

(75) Inventors: Timothy Paul James Gerard Kindberg, Bristol (GB); Jean Tourrilhes, Mountain View, CA (US); Kan Zhang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 811 days.

(21) Appl. No.: 10/769,190

(22) Filed: Jan. 30, 2004

(65) Prior Publication Data

US 2005/0172145 A1    Aug. 4, 2005

(51) Int. Cl.
    *H04L 9/00* (2006.01)
(52) U.S. Cl. ............ 713/168; 713/169; 713/170; 713/171; 713/182; 380/247; 380/270
(58) Field of Classification Search ........ 380/249, 380/283, 247, 270; 455/411; 713/168–171, 713/182
See application file for complete search history.

(56) References Cited

U.S. PATENT DOCUMENTS

| | | | |
|---|---|---|---|
| 4,200,770 A | | 4/1980 | Hellman et al. |
| 5,655,028 A | * | 8/1997 | Soll et al. ............ 382/133 |
| 5,814,968 A | * | 9/1998 | Lovegreen et al. ....... 320/113 |
| 5,887,063 A | | 3/1999 | Varadharajan et al. |
| 5,930,368 A | | 7/1999 | Hocker et al. |
| 5,933,502 A | | 8/1999 | Aucsmith et al. |
| 6,302,790 B1 | * | 10/2001 | Brossard .............. 463/20 |
| 6,335,972 B1 | * | 1/2002 | Chandersekaran et al. .. 380/286 |
| 6,545,590 B1 | * | 4/2003 | Katayama ........... 340/7.62 |
| 6,707,914 B1 | * | 3/2004 | Bell ................... 380/46 |
| 6,999,731 B2 | * | 2/2006 | Cronin ............... 455/88 |
| 7,215,775 B2 | * | 5/2007 | Noguchi et al. ........ 380/249 |
| 2003/0065918 A1 | | 4/2003 | Willey |
| 2006/0020797 A1 | * | 1/2006 | Zhang et al. .......... 713/169 |
| 2006/0031675 A1 | * | 2/2006 | Zhang et al. .......... 713/168 |
| 2006/0209843 A1 | * | 9/2006 | Zhang et al. ....... 370/395.32 |

FOREIGN PATENT DOCUMENTS

WO    WO 01/57625    8/2001

OTHER PUBLICATIONS

Tim Kindberg, Securing Spontaneous Interactions, 2003, pp. 1-6.*

(Continued)

*Primary Examiner*—Kim Vu
*Assistant Examiner*—April Y. Shan (57) ABSTRACT

The present invention provides for validating an association between computing devices using a succession of human-perceptible stimuli such as sounds, lights colors or shapes. Commands are sent from the initiating device to the responding device in encrypted messages. Human-perceptible stimuli are formed at the responding device in response to at least some of the commands. The responder searches for messages that the responder is unable to decrypt and that are received in a time interval before messages that the responder is able to decrypt. The succession of human-perceptible stimuli may be harmonized, in which case, an association between the initiating device and the responding device is validated when the human-perceptible stimuli formed by the initiating device and the human-perceptible stimuli formed by the responding device are harmonized together.

25 Claims, 4 Drawing Sheets

OTHER PUBLICATIONS

Asokan, N. et al., "Key Agreement in Ad-hoc Networks," Nokia Group, Finland 2000.

Balfanz, D. et al., "Talking to Strangers: Authentication in Ad-Hoc Wireless Networks," Network and Distributed System Security Sympposium, San Diego, CA, USA 2002.

Kindberg, T. et al., "Context Authentication Using Constrained Channels," Hewlett-Packard Development Company Technical Report 2001.

Kindberg, T., et al., "Secure Spontaneous Device Association," Fifth Annual Conference on Ubiquitous Computing, Seattle, Washington, Oct. 2003.

Kindberg, T. et al., "Validating and Securing Spontaneous Associations between Wireless Devices," Hewlett-Packard Company Technical Report 2002.

Stajano, F. et al., "The Resurrecting Duckling: Security Issues for Ad-hoc Wireless Networks," In B. Christianson, B. Crispo and M. Roe (Eds.) Security Protocols. 7th International Workshop Proceedings, Lecture Notes in Computer Science, Springer-Verlag Berlin Heidelberg 1999.

* cited by examiner

VALIDATION FOR SECURE DEVICE ASSOCIATIONS

FIELD OF THE INVENTION

The present invention relates to the field of ubiquitous computing. More particularly, the present invention relates to the field of associating computing devices in a manner that allows for secure communications between the devices.

BACKGROUND OF THE INVENTION

Ubiquitous computing refers to a trend in which computing devices are becoming increasingly more prevalent and useful in everyday activities. For example, persons are more frequently carrying computing devices with them as they go about their daily activities. Often, such devices are most useful when they interact with other devices. Thus, an important aspect of ubiquitous computing is spontaneous device association. Examples of possible spontaneous associations include: a person sending a photograph taken using a camera-telephone to a digital picture frame at the home of another person; two teenagers who encounter one another in a shopping mall play a wireless video game together; or two colleagues who meet at a conference and transfer a document from one's PDA (personal digital assistant) to another's laptop computer.

Such interactions preferably occur spontaneously, given the circumstances and current activity of the person or persons involved, and require minimal effort to set up. In addition, because spontaneous interactions are expected to occur in untrustworthy environments, some security as to the interactions is also important. In the example above in which a person transfers a photograph within someone's home, if the transfer is performed wirelessly and in absence of appropriate security measures, a third party in a nearby home may be able to also receive the photograph. And, in the example of two colleagues exchanging a document at a conference, the document may contain sensitive business information while the conference may also be attended by business rivals. Thus, some degree of security is desired to prevent a third party from eavesdropping on a communication.

One type of security attack is known as "man-in-the-middle." In this attack, two parties attempt to communicate directly with each other. However, messages intended to be exchanged between them are instead intercepted by third party. The third party emulates each party from the perspective of the other so that the two parties are unaware of the presence of the third party or "man-in-the-middle."

Further, in environments having multiple devices, a pair of devices may attempt to associate with each other near in time that another pair of devices attempts to associate with each other. It may then occur that a member of each pair becomes mistakenly associated with a member of the other pair.

To address these problems, it is known to use a physically constrained channel, such that only devices in a certain physical context may transmit or receive a message via the channel. Examples of physically constrained channels include direct electrical contact, a human body in contact with the devices, infrared beacons, combinations of ultrasound and radio propagation, laser beams, 60 GHz radio and audio. However, none of these physically constrained channels provides guarantees against unauthorized parties sending or receiving messages due to such factors as refraction, reflection and sensitive receivers that can detect faint signals.

Therefore, what is needed is an improved technique that may be used to secure communications between computing devices. What is further needed is such a technique that has an ability to counter a "man-in-the-middle" attack and to avoid unintended associations. It is toward these ends that the present invention is directed.

SUMMARY OF THE INVENTION

The present invention provides for validating an association between computing devices using a succession of human-perceptible stimuli such as sounds, lights, colors or shapes. Commands are sent from the initiating device to the responding device in encrypted messages. Human-perceptible stimuli are formed at the responding device in response to at least some of the commands. The responder searches for messages that the responder is unable to decrypt and that are received in a time interval before messages that the responder is able to decrypt. In one embodiment, the succession of human-perceptible stimuli may be harmonized, in which case, an association between the initiating device and the responding device is validated when the human-perceptible stimuli formed by the initiating device and the human-perceptible stimuli formed by the responding device are harmonized together.

These and other aspects of the present invention are described in more detail herein.

DETAILED DESCRIPTION OF A PREFERRED EMBODIMENT

The present invention provides for validating an association between computing devices. The present invention is particularly useful where such devices are associated spontaneously and with little foreknowledge of the other's parameters. For example, it is not necessary for either device to know a network address or public encryption key of the other device before the devices encounter each other. Further, the present invention provides a quick and convenient validation of the association. Thus, exchange of information and protocol execution are performed quickly and conveniently. In addition, the present invention ensures that the devices intended to be associated are in fact the ones being associated and helps to guard against eavesdroppers. Once an association of devices is formed and validated in accordance with the present invention, the devices may then securely exchange information.

Figure 1:
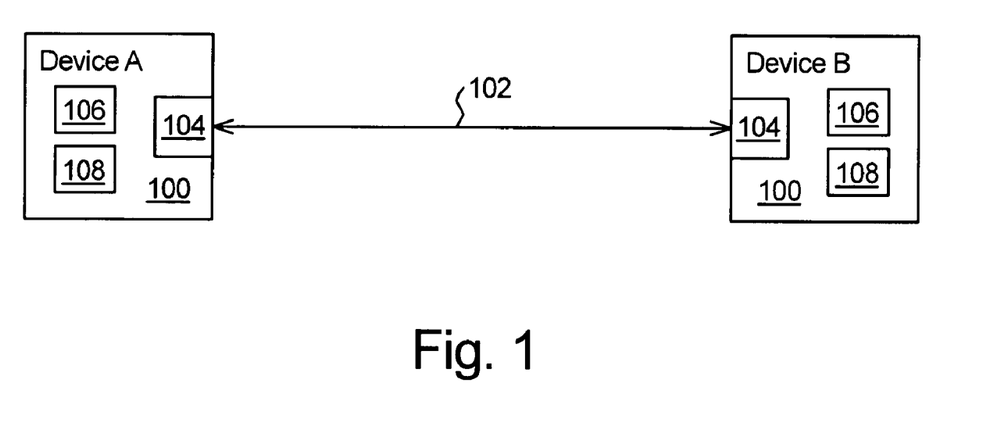
FIG. 1 illustrates a pair of devices that attempt to form a secure association in accordance with an embodiment of the present invention.

FIG. 1 illustrates a pair of computing devices 100 (labeled "Device A" and "Device B") that attempt to form a secure association in accordance with an embodiment of the present invention. The devices 100 each include computing and communication capability, while at least one of the devices 100 is portable. Examples of such devices are cellular telephones, personal digital assistants (PDAs), and personal computers (e.g., laptop or notebook). Further examples may include portable electronic game devices, digital cameras, digital displays, such as a digital picture frame that is capable of displaying images or video clips stored therein, printers, point-of-purchase kiosks, and so forth. As shown in FIG. 1, the devices 100 communicate with each other via a communication media 102. In a preferred embodiment, the communication media 102 implements wireless communications, such as radio frequency or infrared communications. The wireless communications may be, for example, in accordance with an IEEE 802.11 protocol (i.e. 802.11a, 802.11b, or 80211g) or another protocol which allows for broadcast messages.

Each device 100 also includes a transmitter and receiver 104 for communicating via the media 102, a controller 106 for controlling operation of the device 100 and a user interface for forming human-perceptible stimuli 108, which may include a speaker, a display screen, an LED and so forth.

Generally, Device A and Device B are each controlled by a different person. The persons may encounter each other in a variety of contexts in which it is desired for their respective devices Device A and Device B to communicate with each other, either to receive information from the other person's device, to send information to the other person's device or both. In other embodiments, a person with a device may wish to have the device communicate with another device that is not controlled by a person, such as a point-of-purchase kiosk. In either case, before the information is sent, a secure association is formed between the devices so as to prevent an authorized third party from obtaining access to the information.

Figure 2:
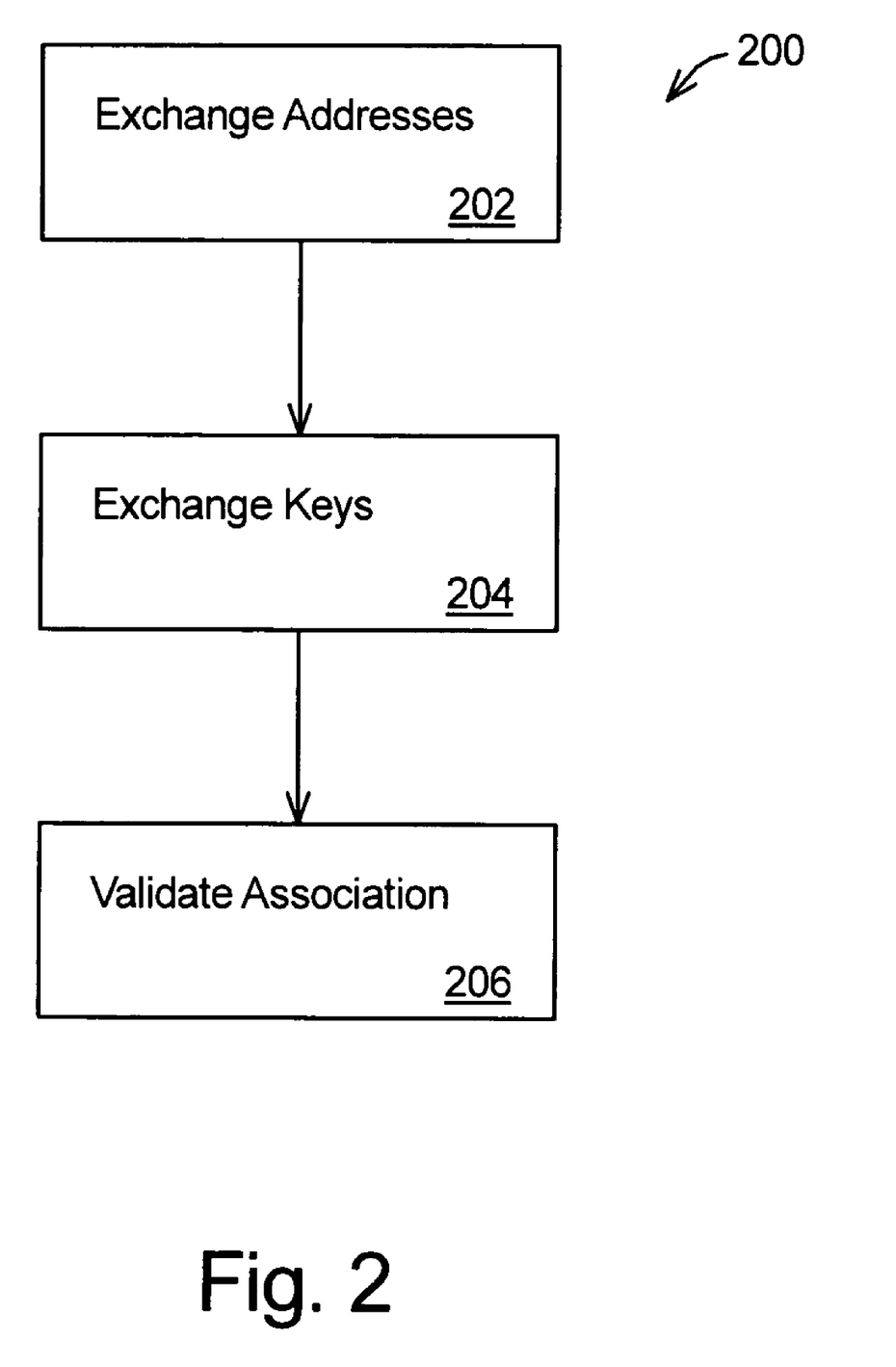
FIG. 2 illustrates a flowchart of a method for forming a secure association of devices in accordance with an embodiment of the present invention.

FIG. 2 illustrates a flowchart of a method 200 for forming a secure association of devices in accordance with an embodiment of the present invention. The method 200 may be implemented, for example, by appropriate computer code stored in computer readable media at each of the devices 100. In step 202, the devices 100 of FIG. 1 exchange network addresses. This may be accomplished, for example, by each person triggering their respective device to enter an association mode in which each device broadcasts its network address. Each device listens for association messages and correlates them in time to deduce the network address of the other device. Each device may then use the network address of the other device to address future messages to the other device. An example of a known protocol which may be used to exchange network addresses is the SWAP-CA specification.

Then, in step 204, the devices 100 exchange encryption keys. After the key exchange, Device A possesses key KA and Device B possesses key KB. In a preferred embodiment, the key exchange satisfies the unique key property, meaning that a man-in-the-middle is prevented from establishing a common key for the two devices. An example of a known protocol that may be used for the key exchange and that satisfies the unique key property is the Diffie-Hellman protocol which involves independent selection of random numbers by the two parties for generation of the keys.

Thus, steps 202 and 204 form an association between Device A and Device B. Once this association is established it is desired to validate the association by ensuring that the devices intended by the human operator(s) to be associated are, in fact, the devices that have been associated and that the association is secure. The association is validated in step 206. This includes ensuring that at least one of the devices responds to commands sent by the other device and analyzing traffic between the devices. Ensuring that a device responds to commands of the other is discussed below and then analyzing the traffic is discussed.

In step 206, one of the devices (an "initiator") sends commands to the other device (the "responder") to form a succession of human-perceptible stimuli which a human operator(s) is then able to perceive. If the correct succession of stimuli is formed by the responder, this indicates that the responder is responding to the initiator. Otherwise, if the responder is not responding to the initiator, this may indicate that the devices have associated with other devices not intended by the operators. If the responder is not responding to the initiator, a human operator may control their device to abort the process. If desired, another attempt may be performed.

In one embodiment, the human operator of the initiator selects the human perceptible stimuli to be formed at the responder. For example, the human operator may instruct his or her device (e.g., by manipulating its user interface) to send a command to the responder that instructs the responder to illuminate its display screen with the color green. The human operator of the initiator can then see the color green being displayed at the responder. Then, the human operator of the initiator may have his or her device send the same command again or a different command to the responder, such as to display the color red. Once a succession of such commands have been successfully sent and verified, then the operator can be reasonably certain the responder is receiving the commands from the initiator. So that both operators can independently verify this, the devices may switch roles in which the initiator now acts as the responder to commands sent by the other device.

Preferably, the sending of commands to the responder and verifying that the responder forms the correct stimuli are performed in rapid succession. This is so that if there is a man-in-middle relaying the messages, the time interval between the man-in-the-middle receiving a message from the initiator and then having to forward the command to the responder is minimized. For example, the time interval may be minimized by the operator of the initiator device pressing a button on the device to cause a particular command to be sent to the responder; a rapid succession of commands could then be sent by the operator repeatedly pressing buttons. Minimizing this time interval will tend to make it easier to detect the presence of the man-in-the-middle, as is explained herein.

In another embodiment, the initiator has a pre-stored succession of human-perceptible stimuli. Commands are sent to the responder instructing the responder to form the stimuli while the human operator of the initiator verifies that the responder is responding to the commands. The initiator may inform its operator of the commands it is sending so that the operator of the initiator can tell whether the responder responding appropriately. For example, the initiator may display the color red on its display screen while it sends a command to the responder to display the color red on its display screen. As another example, the initiator may display the title of a popular song while it sends a command to the responder for each note of the song (or a portion of the song). In this case the human operator of the initiator determines whether the responding device is playing the song correctly.

As yet another example, the initiator may form a succession of human-perceptible stimuli that is harmonized with a succession of human perceptible stimuli that it instructs the responder to form. For example, a source multimedia stream may include a portion of musical melody. While the stream plays out, the initiator forms some of the notes while the device consults a corresponding harmonized stream. When an event occurs in the harmonized stream, the device does not render it itself, but instead, sends a message to the other device to render it. In this manner, Device A and Device B together form a harmonized sequence of human-perceptible stimuli, including sounds and possibly visual indicators, such as flashing lights. The human operators are expected to perceive whether streams are harmonious based on the streams being perceived more or less as a whole. This is expected to allow the human operator(s) to readily determine whether the devices are associated without the human operators having to expend the effort required to ensure that the responder is responding appropriately on a command-by-command basis.

For example, one of the devices may play a bass part of a melody, while the other device may play a harmonized piano part. As another example, one of the devices may play a melody while the other device forms a synchronized pattern of changing colors or flashing lights. As yet another example, the two devices may form identical harmonies of sounds and possibly visual stimuli. Thus, each device forms a stream of sounds or other stimuli that is harmonized with the stream formed by the other device. Some care should be used in the selection of the harmonized streams and in assigning the portions to be rendered by each of the devices. For example, there should be a sufficient rate of events in each portion for the human operator(s) to be able to determine whether the streams are harmonious when rendered together.

When the sounds and possible other stimuli collectively form a harmony which can be perceived by the operators of Device A and Device B, this indicates that the responder is responding to the initiator.

Figure 3:
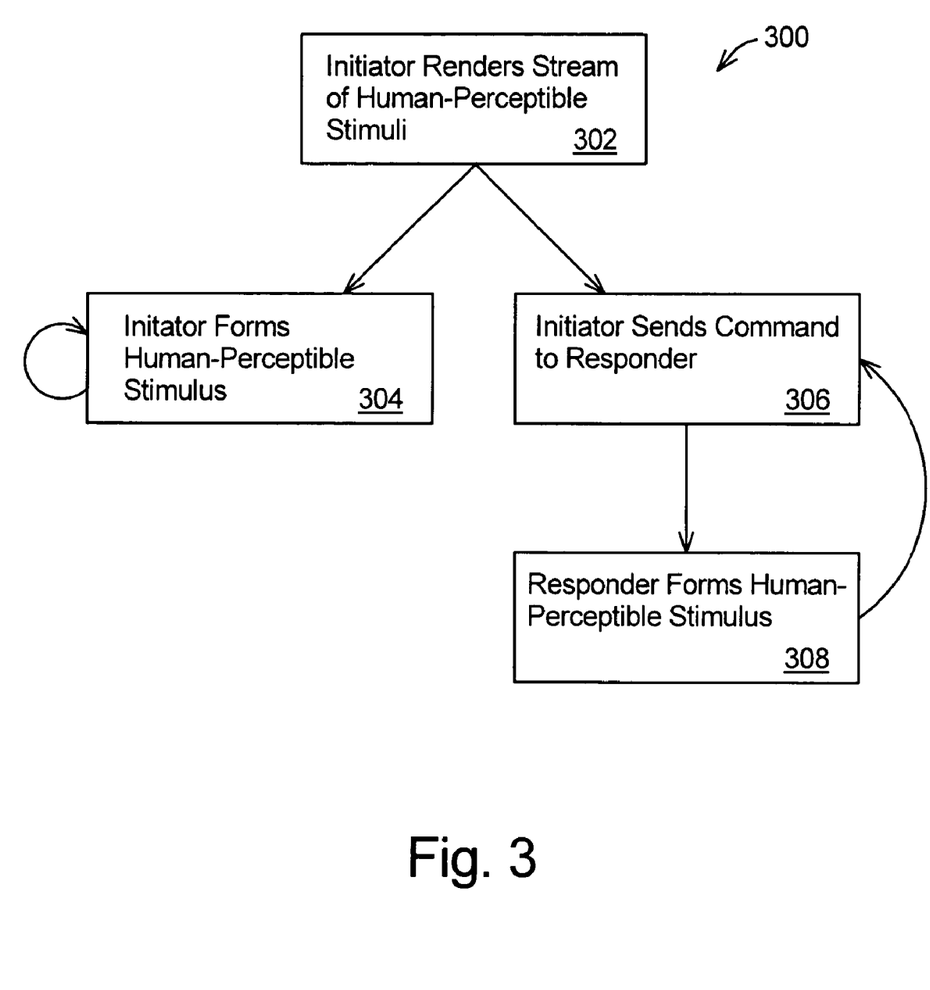
FIG. 3 illustrates a flowchart of a method for validating a secure association of devices in accordance with an embodiment of the present invention.

FIG. 3 illustrates a flowchart of a method 300 for validating a secure association of devices using a harmonized succession of events in accordance with an embodiment of the present invention. This method 300 may be performed in step 206. For performing the method 300, one of the devices 100 is designated as the initiator while the remaining device 100 is designated the responder. This may be accomplished, for example, by designating the device having the highest network address as initiator and the remaining device as responder (or vice-versa). In the description that follows Device A is the initiator, while Device B is the responder.

In step 302, the device designated as initiator (Device A) renders a stream of harmonized events. More particularly, the sequence of harmonized events may be stored in memory at the initiator and retrieved by its controller 106. A number of different sequences may also be stored in memory from which a particular one to be used can be selected. Based on the selected sequence, the initiator generates a sequence of commands that instruct a recipient of the commands (Device B) to form a particular sound, tone or other stimulus, such as flashing a light or a color for each command and also generating a sequence of events to be performed by the initiator. A speaker included in a device may be used for forming sounds, while indicator lights (e.g., LEDs) or a display screen (e.g., an LCD display) may be used to flash lights or colors.

In step 304, human-perceptible stimulus is formed at the initiator (Device A). The step 304 is repeated for each event to be performed by the initiator so that the initiator forms a sequence of stimuli that comprises its portion of the harmony. While the initiator is playing its portion of the harmony, the responder is playing its portion. Thus, in step 306, a command is sent from the initiator (Device A) to the responder (Device B). The command is included in a message encrypted using the initiator's key KA and sent from the initiator to the responder. In step 308, the responder forms a stimulus that is perceptible to the human operator(s) of the devices in response to the sound command received in step 306. The steps 306 and 308 are repeated for each event to be performed by the responder so that the responder plays its portion of the harmony. To verify that the responder's stream is the intended harmonized stream, the initiator can preferably be set to either render the entire sequence of events (including the responder's portion) or only the initiator's portion. This will reduce the ability of an attacker to fool a human operator by having the one device play an incorrect stream, but one that appears to be harmonious with the one rendered by the other device.

Figure 4:
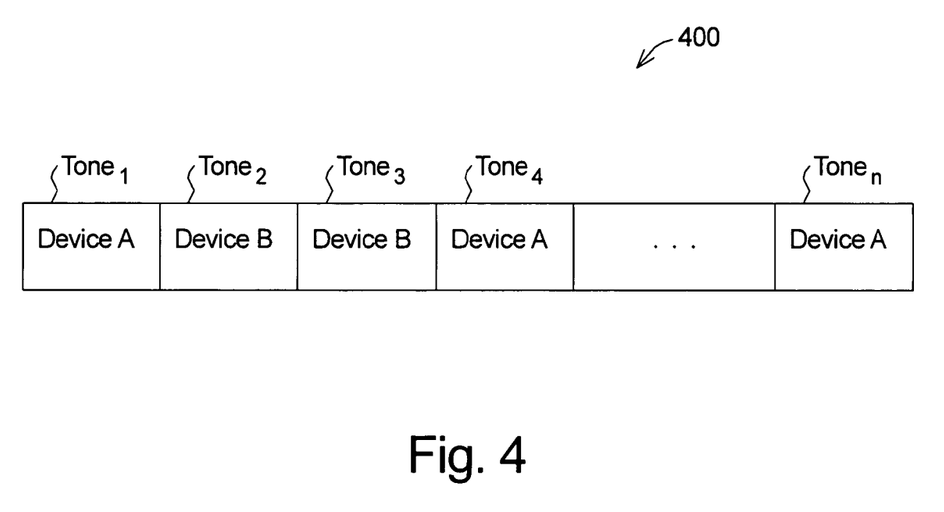
FIG. 4 illustrates an exemplary musical harmony in which tones are selected to be played by either the initiator or the responder in accordance with an embodiment of the present invention.

FIG. 4 illustrates an exemplary musical harmony 400 in which tones are selected to be played by either the initiator or the responder in accordance with an embodiment of the present invention. For example, the melody 400 may consist of a sequence of tones, $Tone_1$, $Tone_2$, $Tone_3$, $Tone_4$, ..., $Tone_n$. At least some of the tones are played by the initiator and at least some of the tones are played by the responder. The initiator and the responder may alternately take turns forming tones, though multiple tones may be formed by one device before the other device forms takes its turn. The collection of sounds or tones forms the melody. For example, the melody 400 may have been composed as a two-part harmony, in which case, each part may be played by a different one of the devices. While the example of FIG. 4 includes only tones, the sequence may also include lights or other human-perceptible stimuli.

The initiator controls the timing of playing its own portion of the harmony while also controlling the timing of its sending each of a sequence of commands to the responder. If there is a noticeable delay between sending a command to the responder and the responder forming the corresponding stimulus then the initiator preferably takes this into account by sending each command in advance by an appropriate amount of time.

In an embodiment, the initiator sends a sequence of indicator messages $I_i$ at times $T_i$ (where i=0, 1, 2, 3, ..., N) to what it believes is the network address of the responder. Assume that the two devices communicate via 802.11b, in ad hoc mode, using a predefined channel, SSID and network port number. One user, say Bob, agrees to be the initiator; and Alice to be the responder. Bob begins by listening for packets with the network interface in "monitor" mode. In that mode, his device can receive all packets on the network, regardless of the 802.11 SSID or BSSID. Even if an attacker succeeds in placing Alice and Bob in separate cells ("independent basic service sets"), Bob can still receive Alice's packets if she is in radio range, regardless of their address. Unfortunately, however, Bob cannot transmit packets when the network interface is in monitor mode.

Each indicator message Ii may be constructed as follows:

$$I_i = \{N_i, command\}KA$$

where $N_i$ is a nonce (i.e. a hard to guess value that is not reused) and command is a command, such a "switch light on," "switch light off" or "play trumpet note F#"; {M}K denotes encryption of the message M by key K; and KA is the initiator's key. The responder attempts to decrypt all packets belonging to the protocol, and verifies whether decryption is successful, i.e., whether the result contains a command conforming to expected vocabulary and syntax. Subject to rules laid out below, it executes successfully decrypted commands.

Analysis of communication traffic between the devices is performed in an attempt to verify that the association of the devices is secure. As mentioned, this traffic analysis is performed as part of the step 206 (FIG. 2). Particularly, this is to detect the presence of a "man-in-the-middle." In one type of possible attack, a man-in-the-middle may have established an association between itself and the initiator such that the man-in-the-middle is able to receive and decrypt messages from the initiator. In addition, the man-in-the-middle may also have established an association between itself and the responder such that the man-in-the-middle is able forward commands received from the initiator to the responder. If successful, this may result in the responder appropriately responding to the commands of the initiator (e.g., both devices may play their respective portions of a harmony correctly) and thus allows the eavesdropping man-in-the-middle to go undetected.

In this situation, the responder is unable to successfully decrypt the content of the messages from the initiator since, by the unique key property, a man-in-middle will use a different key and thus will have established itself as the only party able to decrypt the content of those messages. Note that the responder, however, being for example in IEEE 802.11 monitor mode, will generally be able to detect the presence of messages sent by the initiator, even if the responder is unable to decrypt the content of those messages. In addition, the responder is able to decrypt the content of messages from the man-in-the-middle since the man-in-middle will have successfully associated itself with the responder. In an embodiment, this situation is detected by the responder by looking for evidence of packet relaying. Thus, the responder listens for messages that it cannot decrypt in addition to the messages that it can decrypt. If there is a correlation between these two different types of messages in which a message that it cannot decrypt falls within a time interval that precedes each message that it can decrypt, this may indicate the presence of a man-in-the-middle. A message that it cannot decrypt and that falls within the time interval preceding a message that it can decrypt is referred to herein as a "just-before" message. Thus, where a number (e.g., three or six) of just-before messages are detected, the responder may abort the association and/or signal to its human operator a "failure to associate" message.

To accomplish this, the responder may record the time of arrival and source address of each message it receives. For each message having a command that it executes, the responder identifies just-before messages by looking for other messages that it could not decrypt and that were received in a time interval before it received the message that was executed. The responder may also examine the source address of the just-before messages and, if several of the just-before messages have a common source address, this further indicates the presence of a man-in-the-middle. This is because these just-before messages are likely to have been sent by the initiator while the man-in-the-middle will generally not be able to block the source address of the initiator when it relays commands.

If a man-in-the middle is not detected despite having searched for just-before messages (and the responder is responding to the initiator) the association is validated as being secure.

In a more sophisticated attack, the man-in-the-middle may send more messages to the responder than it receives from the initiator. These additional messages may not include a command or may include a command that does not result in a human-perceptible stimulus being formed at the responder. As such, these additional messages will not interfere with the human operator(s) determining whether harmonized sequence of sounds and other stimuli has been formed. For example, such an additional message may instruct the responder to form a sound, but with the volume level turned all the way down. The presence of these messages makes it more difficult for the responder to detect just-before messages since there is a many-to-one correspondence between messages that it can decrypt and messages that it cannot. To counter this type of attack, the responder may distinguish between the messages it receives that will result in a forming a human-perceptible stimulus and which will not. This may be accomplished by adding constraints to the messages in the received sequence. One possible constraint is that each successive command must produce a state that is distinct from the previous state. Another possible constraint is that each state must have a minimum value for duration, volume or brightness before a subsequent state is entered to ensure that the state is perceptible to a human. The minimum values may be different depending on the state. For example, the minimum time duration for a sound may be different from the minimum duration for flashing a light.

Thus, on receipt of a packet, the responder decrypts the packet using the expected key that it shares with initiator. If the message contains a recognizable command and it satisfies the constraints, the responder executes the command. If a message does not satisfy these constraints, then the responder may ignore the message. Alternatively, if a message otherwise satisfies the constraints, but it does not meet the minimum time duration constraint, the responder may wait until the prior state has reached the minimum duration before executing the command. If the command was sent by a man-in-the-middle, this will likely result in an incorrect or inharmonious stream being played.

If the responder fails to render a stream of indicators, or if each indicator in the stream is not individually recognizable or if the stream is not harmonious, then the human operator(s) can conclude that the devices have failed to associate securely. The operator(s) may decide to attempt to repeat the process using a fresh key.

Further, the responder uses only those messages that will result in forming a human-perceptible stimulus in its search for just-before messages. The responder thus correlates only those messages that will result in forming a human-perceptible stimulus to the other messages it receives. Distinguishing between the messages that will result in a forming a human-perceptible stimulus and those which will not, and ignoring those that will not, can be expected to result in the remaining messages having a one-to-one correspondence with the just-before messages, facilitating detection of the man-in-the-middle.

Since message delivery may be unreliable in that messages may be dropped or lost, the responder's stream may be missing some parts. Verification would then fail. This would be a false positive result, but would not cause harm since the verification process may then be repeated.

In some cases, just-before messages may result from causes other than a man-in-the-middle. For example, where other devices are carrying-on a communication session nearby, their messages may be detected by the responder as occurring just before messages from the initiator. As a result, the responder may falsely detect a man-in-the-middle when there is none. The chances of this occurring can be minimized somewhat by increasing the number of just-before messages that must be detected before the session is aborted. In any event, a false detection of a man-in-the-middle when there is none may be preferred over a failure to detect a man-in-the-middle when one does exist. Further, this is expected to occur rarely since the different devices would commence the verification process at random start times and because they would likely select different harmonious streams of stimuli.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of validating a device association using a succession of human-perceptible stimuli comprising:
   sending commands from an initiating device to a responding device in encrypted messages;
   forming human-perceptible stimuli of the succession at the responding device in response to at least some of the commands;
   forming at least some of the human-perceptible stimuli of the succession at the initiating device, wherein an association between the initiating device and the responding device is validated when the succession of human perceptible-stimuli formed by the initiating device and by the responding device is perceptibly harmonized; and
   searching for messages received at the responding device that the responding device is unable to decrypt and that are received in a time interval before messages that the responding device is able to decrypt; and
   indicating an unsuccessful association when a number of messages are received at the responding device that the responding device is unable to decrypt and that are received in a time interval before messages that the responding device is able to decrypt.

2. The method according to claim 1, further comprising communicating data other than commands between the devices after the association is validated.

3. The method according to claim 1, further comprising aborting further communication between the devices when the human-perceptible stimuli formed by the initiating device and the human-perceptible stimuli formed by the responding device are not harmonized.

4. The method according to claim 1, wherein the initiating device informs its operator of the commands it is sending.

5. The method according to claim 4, wherein the initiating device informs its operator of the commands it is sending by forming the human-perceptible stimuli formed by the responding device.

6. The method according to claim 4, wherein the initiating device informs its operator of the commands it is sending by displaying the title of a song.

7. The method according to claim 1, wherein the succession of human-perceptible stimuli includes sounds.

8. The method according to claim 1, wherein the succession of human-perceptible stimuli includes flashing lights.

9. The method according to claim 1, wherein the succession of human-perceptible stimuli includes changing colors.

10. The method according to claim 1, wherein the succession of human-perceptible stimuli includes changing shapes.

11. The method according to claim 1, further comprising identifying messages received at the responding device that the responding device is able to decrypt and that do not result in forming a human-perceptible stimulus.

12. The method according to claim 11, further comprising ignoring the messages received at the responding device that the responding device is able to decrypt and that do not result in forming a human-perceptible stimulus.

13. The method according to claim 11, further comprising delaying forming a next human-perceptible stimulus when a duration for forming a current human-perceptible stimulus falls below a minimum value.

14. The method according to claim 1, further comprising exchanging encryption keys between the initiating device and the responding device.

15. The method according to claim 1, further comprising exchanging network addresses between the initiating device and the responding device.

16. An initiating device for validating a spontaneous association with a responding device, comprising:
   a controller rendering a harmonized succession of human-perceptible stimuli;
   a user interface forming at least some of the human-perceptible stimuli at the initiating device; and
   a transmitter sending encrypted commands from the initiating device to a responding device, the commands instructing the responding device to form at least some of the human-perceptible stimuli at the responding device wherein an association between the initiating device and the responding device is validated when the succession of human perceptible-stimuli formed by the initiating device and by the responding device is perceptibly harmonized.

17. The initiating device according to claim 16, the succession of human-perceptible stimuli including sounds.

18. A responding device for validating a spontaneous association with an initiating device, comprising
   a receiver receiving encrypted commands from the initiating device, the commands for instructing the responding device to form at least some human-perceptible stimuli at the responding device;
   a user interface forming at least some of the human-perceptible stimuli at the responding device wherein the human-perceptible stimuli formed at the responding device is perceptibly harmonized with human-perceptible stimuli formed at the initiating device; and
   a controller searching for messages received at the responding device that the responding device is unable to decrypt and that are received in a time interval before messages that the responding device is able to decrypt wherein the controller indicates an unsuccessful association when a number of messages received at the responding device that the responding device is unable to decrypt and that are received in a time interval before messages that the responding device is able to decrypt.

19. The responding device according to claim 18, the human-perceptible stimuli including sounds.

20. The responding device according to claim 18, wherein the controller identifies messages received at the responding device that the responding device is able to decrypt and that do not result in forming a human-perceptible stimulus.

21. The responding device according to claim 20, wherein the controller ignores the messages received at the responding device that the responding device is able to decrypt and that do not result in forming a human-perceptible stimulus.

22. A computer readable media having stored thereon computer code, which when executed, performs a method of validating a spontaneous association between an initiating device and a responding device, comprising:
- rendering a harmonized succession of human-perceptible stimuli at the initiating device;
- forming at least some of the human-perceptible stimuli at the initiating device; and
- sending encrypted commands from the initiating device to a responding device, the commands for instructing the responding device to form at least some of the human-perceptible stimuli at the responding device wherein an association between the initiating device and the responding device is validated when the succession of human perceptible-stimuli formed by the initiating device and by the responding device is perceptibly harmonized.

23. The computer readable media device according to claim 22, the succession of human-perceptible stimuli including sounds.

24. A computer readable media having stored thereon computer code, which when executed, performs a method of validating a spontaneous association between an initiating device and a responding device, comprising:
- receiving encrypted commands from the initiating device, the commands for instructing the responding device to form at least some human-perceptible stimuli at the responding device;
- forming at least some of the human-perceptible stimuli at the responding device wherein the human-perceptible stimuli formed at the responding device is perceptibly harmonized with human-perceptible stimuli formed at the initiating device;
- searching for messages received at the responding device that the responding device is unable to decrypt and that are received in a time interval before messages that the responding device is able to decrypt; and
- indicating an unsuccessful association when a number of messages are received at the responding device that the responding device is unable to decrypt and that are received in a time interval before messages that the responding device is able to decrypt.

25. The computer readable media according to claim 24, the human-perceptible stimuli including sounds.

* * * * *